United States Patent [19]

Kliment et al.

[11] 3,925,895

[45] Dec. 16, 1975

[54] HYDROPHILIC ROOT CANAL FILLING MATERIAL

[75] Inventors: Karel Kliment, Princeton; Robert S. Tu, East Brunswick, both of N.J.

[73] Assignee: National Patent Development Corporation, New York, N.Y.

[22] Filed: Apr. 26, 1973

[21] Appl. No.: 354,866

[52] U.S. Cl. .................................................. 32/15
[51] Int. Cl.² .......................................... A61K 5/01
[58] Field of Search ........................ 32/15; 260/45.5

[56] References Cited
UNITED STATES PATENTS

| | | | |
|---|---|---|---|
| 2,745,817 | 5/1956 | Logemann et al. | 32/15 X |
| 3,367,788 | 2/1968 | Sheldon et al. | 32/15 X |
| 3,715,331 | 2/1973 | Molnar | 32/15 |
| 3,740,850 | 6/1973 | Bowen et al. | 32/15 |
| 3,751,399 | 8/1973 | Lee, Jr. et al. | 32/15 X |
| 3,792,531 | 2/1974 | Rossi | 32/15 |

*Primary Examiner*—Hugh R. Chamblee
*Attorney, Agent, or Firm*—Cushman, Darby & Cushman

[57] ABSTRACT

Root canal therapy is carried out by forming a hydrophilic acrylate or methacrylate polymer in situ. Preferably a radiopaque material is included.

27 Claims, No Drawings

HYDROPHILIC ROOT CANAL FILLING MATERIAL

The present invention relates to root canal therapy.

Conventional root canal application includes the use of solid gutta-percha and/or silver points together with cements for filling the cavities of the teeth. Because they require tedious handling and give poor filling performance, the dental profession is not satisfied with these materials.

An ideal root canal filling material must be non-toxic, inert, radiopaque and durable. To provide a good seal with permanent fit, it must penetrate and fill the entire cavity, including the accessory canals and fine crevices. These fine structures can not be reached by conventional solid materials. Additionally it must be simple and easily handled by a dentist.

According to the invention there is employed in situ polymerization of a hydrophilic acrylate or methacrylate in the root canal application. In the liquid or semi-liquid state the formulation containing a monomer or monomers is injected and subsequently solidified, thus sealing the root canal. Since a material in the fluid state can penetrate more than a solid material, the in situ polymerized implant is, therefore, a better filling material then conventional solid materials and can fill crevices unreachable by solids.

The hydrophilic polymers formed absorb water from the tooth and through the apex. The implant of the invention is thus hydrated and swelled. As the result of volume expansion, the hydrophilic root canal filling material is capable of sealing the entire void of the root canal. On the contrary, hydrophobic systems are not swelled by water under the same conditions and also suffer from the normal volume contraction after polymerization. Hydrophobic root canal filling materials are, therefore, incapable of sealing completely the cavities of the tooth and leakage from the apex may occur.

As stated the hydrophilic material in the liquid or semi-liquid state penetrates into the accessory canals and other fine structures of the tooth normally not reached by the solid points. It therefore provides a more complete filling.

The polymerized hydroxyethyl methacrylate (polymerized HEMA) is compatible with human tissue and is non-toxic. Polymers of HEMA are the preferred polymers formed in the invention.

To prevent premature polymerization the polymerizable monomer (or monomers) and the polymerization catalyst or accelerator are kept separate as components A and B respectively until just before use. Thus component A can comprise the hydrophilic monomer or monomers or a combination of hydrophilic and hydrophobic monomers. Preferably, but not essentially there are included finely divided particles of a radiopaque material and/or an active filler(i.e., a thickening agent). Also preferably there is employed a reducing agent and an antioxidant to prevent premature polymerization. Component B contains an initiator for free radical polymerization and preferably includes an active filler and also preferably includes finely dispersed particles of a radiopaque material and also preferably includes a solvent. While either component A or B can be solid, liquid or paste, the mixture of components A and B should be at least as fluid as a paste so that it can fill the crevices in the root canal. Components A and B are normally mixed just prior to injection into the root canal, e.g., by mixing them in a syringe and forcing the mixture from the syringe into the root canal.

Component A can be modified to contain another hydrophilic monomer or a combination of hydrophilic or hydrophobic monomers with or without a hydrophilic polymer or polymers or a combination of hydrophilic and hydrophobic polymer, preferably with a reducing agent, with or without finely dispersed particles of a radiopaque material, and with or without an active filler or other thickening agent. Depending upon the composition of component A, component B may be modified to contain an initiator for radical polymerization with or without an active filler or other thickening agent, with or without finely dispersed particles of a radiopaque material and with or without an inert solvent.

Preferably there is employed a sufficient amount of the radiopaque material to render the final polymer fully radiopaque when photographed with X-rays.

Any conventional radiopaque material can be employed such as barium sulfate, tantalum, iodoalphionic acid, iopanoic acid and ipodoic acid and the other radiopaques set forth in Kirk-Othmer Encyclopedia of Chemical Technology, 2nd edition, Vol. 17, pages 130–141. The entire disclosure of this article in Kirk-Othmer is hereby incorporated by reference. The preferred radiopaque material, however, is bismuth subcarbonate which has been found more effective than barium sulfate.

Preferably there is also employed a sufficient amount of the active filler or other thickening agent to give the final paste thixotropic properties. The paste should flow freely under pressure, but the moment the pressure is lifted it should gel again and not flow.

Preferably there is also employed a sufficient amount of the radical polymerization catalyst and reducing agent to initiate the polymerization at room temperature within 5 to 10 minutes and complete the polymerization of the paste in the root canal within another 5 to 10 minutes.

Preferably the polymerized mixture also should be regulated to swell with hydration by between 5 to 25 volume percent.

As the active filler or thickening agent there is preferably employed finely divided silica such as Cab-O-Sil but there can be used other thickening agents such as methyl cellulose, carboxymethyl cellulose, etc. As fillers there can also be included hydrated alumina, diatomaceous earth, bentonite, talc, chalk, fuller's earth, powdered glass or quartz.

Any convention free radical polymerization catalyst can be used such as peroxides, e.g. benzoyl peroxide, methyl ethyl ketone peroxide, t-butyl peroctoate, isopropyl percarbonate, cumene hydroperoxide, dicumyl peroxide, 2,4-dichlorobenzoyl peroxide, potassium persulfate, sodium perborate, diisopropylbenzene mono hydroperoxide, ammonium persulfate, etc.

The preferred reducing agent (accelerator) is N,N-dihydroxyethyl-p-toluidine but other conventional amino-type reducing agents, e.g., dimethyl-p-toluidine, N,N-dimethyl aniline, ferric ethylene dinitrilotetraacetate, polyethylene polyamines, e.g., tetraethylene pentamine, etc. can also be used. The use of the reducing agent is not essential but it is employed simply to hasten the polymerization.

There can be used conventional redox systems such as organic peroxides (e.g., those mentioned above) and a thiosulfate, e.g., benzoyl peroxide-sodium thiosulfate, or organic hydroperoxide and hydrazine or its derivatives, e.g., cumene hydroperoxide and hydrazine, organic peroxides and reducing sugars, e.g., benzoyl peroxide and fructose or glucose.

The antioxidant employed to prevent the premature polymerization of the monomer can be any conventional phenolic antioxidant, e.g., 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butylphenol), 2,6-butyl-4-decyloxyphenol, 2-t-butyl-4-dodecoxyphenol, 2-t-butyl-4-dodecyloxyphenol, 2-t-butyl-4-octadecyloxyphenol, 4,4'-methylene-bis-(2,6-di-t-butylphenol), p-aminophenol, N-lauryloxy-p-aminophenol, 4,4'-thiobis (3-methyl-6-t-butylphenol), bis[o-(1,1,3,3- tetramethylbutyl) phenol] sulfide, 4-acetyl - $\beta$ - resorcylic acid, A stage p-t-butylphenolformaldehyde resin, 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid and t-butylphenol. It likewise can be omitted, particularly if the monomer is prepared immediately before use.

Omission of the catalyst of course will retard the polymerization of the monomer but the catalyst can be omitted if no polymerization inhibitor (e.g., a phenol) is present in the monomer.

Preferably the hydrophilic monomer used to prepare the hydrophilic polymer is a hydroxyalkyl monoacrylate or methacrylate, such as 2-hydroxyethyl acrylate, 2-hydroxyethyl methacrylate, diethylene glycol monoacrylate or monomethacrylate, hydroxypropyl acrylate or methacrylate, tetraethyleneglycol monomethacrylate, pentaethyleneglycol monomethacrylate, dipropyleneglycol monomethacrylate, dipropyleneglycol monoacrylate or similar hydrophilic monomer. The most preferred monomer is 2-hydroxyethyl methacrylate and the next most preferred monomer is 2-hydroxyethyl acrylate.

In addition to the polymers set forth above, it also has been found that compositions can be prepared from hydrophilic copolymers. The term copolymers is employed generically to cover polymers of 2, 3, 4 or more reactants. Such copolymers include copolymers of hydroxyalkyl monoacrylates or methacrylates of the type set forth above, with 1 to 50 percent, preferably 5 to 25 percent, of alkyl acrylates and methacrylates such as methyl acrylate, ethyl acrylate, the propyl acrylates, the butyl acrylates, methyl methacrylate, ethyl methacrylate, the propyl methacrylates, the butyl methacrylates and similar higher alkyl acrylates and methacrylates.

Other suitable copolymers include copolymers of the hydroxyalkyl acrylates or methacrylates as set forth above with 1 to 60 percent, preferably 5 to 25 percent, of alkoxy alkyl acrylates and methacrylates where the alkyl function has at least 2 carbon atoms, e.g., methoxyethyl acrylate, ethoxyethyl acrylate, propoxyethyl acrylate, butoxyethyl acrylate, methoxypropyl acrylate, methoxybutyl acrylate, methoxyethyl methacrylate, ethoxyethyl methacrylate, propoxyethyl methacrylate, butoxyethyl methacrylate, ethoxypropyl methacrylate, and similar higher alkoxy alkyl acrylates and methacrylates.

There can also be employed copolymers of the hydroxyalkyl acrylates and methacrylates as set forth above with 0.1 to 25 percent, usually at least 1 percent, and preferably 5 to 15 percent, of the ethylenically unsaturated amines. Preferably there can be used various alkylamino alkyl acrylates and methacrylates, various vinyl and alkyl vinyl pyridines, various dialkyl amino alkyl vinyl ethers, various acrylamides or methacrylamides, vinyl pyrrolidones, and similar ethylenically unsaturated amines, such as p-aminostyrene, o-aminostyrene, 2-amino-4-vinyltoluene, alkylamino alkyl acrylates and methacrylates, e.g., diethylaminoethyl acrylate, diethylaminoethyl methacrylate, dimethylaminoethyl acrylate, dimethylaminoethyl methacrylate, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinyl pyridine, 4-vinyl pyridine, 2-ethyl-5-vinylpyridine, dimethylamino propyl acrylate, dimethylamino propyl methacrylate, dipropylaminoethyl acrylate, dipropylaminoethyl methacrylate, di-n-butylaminoethyl acrylate, di-n-butylaminoethyl methacrylate, di-sec. butylaminoethyl acrylate, di-sec. butylaminoethyl methacrylate, dimethylaminoethyl vinyl ether, diethylaminoethyl vinyl sulfide, diethylaminoethyl vinyl ether, aminoethyl vinyl ether, aminoethyl vinyl sulfide, monomethylaminoethyl vinyl sulfide, monomethylaminoethyl vinyl ether, N-(gamma-monomethylamino) propyl acrylamide, N-(beta-monomethylamino) ethyl acrylamide, N-beta-monomethylamino) ethyl methacrylamide, 10-aminodecyl vinyl ether, 8-aminoctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl) aminoethyl vinyl ether, N-cyclohexylaminoethyl vinyl ether, 2-(1,1,3,3-tetramethylbutylamino) ethyl methacrylate, N-t-butylamino-ethyl vinyl ether, N-methylaminoethyl vinyl ether, N-2-ethylhexylaminoethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethyl aminoethyl)-2-hydroxypropyl methacrylate, 2-aminoethyl acrylate, 2-aminoethyl methacrylate, acrylamide, methacrylamide, N-propylacrylamide, N-isopropyl acrylamide, N-isopropyl methacrylamide, N-propyl methacrylamide, N-butyl acrylamide, N-methyl acrylamide and N-methyl methacrylamide, diacetone acrylamide, N-(2-hydroxyethyl) acrylamide and N-(2-hydroxyethyl) methacrylamide.

Furthermore, there can be employed copolymers of the hydroxyalkyl acrylates and methacrylates as set forth above with 0.1 to 15 percent, usually at least 1 percent, and preferably 5 to 15 percent of ethylenically unsaturated carboxylic acids. These include acrylic acid, methacrylic acid, fumaric acid, itaconic acid, aconitic acid, cinnamic acid, crotonic acid, maleic acid, hydroxyalkyl ethylenically unsaturated carboxylic acids, such as mono 2-hydroxypropyl itaconate, mono 2-hydroxyethyl itaconate, mono 2-hydroxyethyl citraconate, mono 2-hydroxypropyl aconitate, mono 2-hydroxyethyl maleate, mono 2-hydroxypropyl fumarate, mono methyl itaconate, monoethyl itaconate, mono methyl Cellosolve ester of itaconic acid (methyl Cellosolve is the monomethyl ether of diethylene glycol), mono methyl Cellosolve ester of maleic acid.

There is normally also employed a small amount of a cross-linking agent, e.g., normally 0.05 to 20 percent, and preferably 0.1 to 2 percent. The cross-linking favorably influences the mechanical properties, swelling and chemical resistance of the final polymers or copolymers. The most suitable cross-linking agents are diacrylates and/or dimethacrylates of ethyleneglycol homologues, including mono-, di-, tri-, poly-, etc. ethyleneglycol. Various other bi- and poly-functional ethylenically unsaturated monomers are also appropriate.

Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl maleate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,4 triacetyltriazine, triallyl phosphite, diallyl ester of benzene phosphonic acid, polyester of maleic anhydride with triethylene glycol, polyallyl glucose, e.g. triallyl glucose, polyallyl sucrose, e.g. pentaallyl sucrose, sucrose diacrylate, glucose dimethacrylate, pentaerythritol tetraacrylate, sorbitol dimethacrylate diallyl aconitate, divinyl citraconate, diallyl fumarate.

For the inert solvent, there can be employed any solvent which is a good solvent for the monomer(s) and/or the combination of monomer(s) and polymer(s) used. Preferably it should be fully miscible with water, non-toxic and non-irritating. Some suitable solvents include water itself, glycerol or its esters, propylene glycol, 1,2 propandiol carbonate, pentaerythritol, diacetin, monoacetin, ethylene glycol, diethylene glycol, dipropylene glycol.

Active fillers or suitable thickening agents can include inorganic and/or organic agents, preferably polymers, both natural, such as cellulosic derivatives, or man-made, specifically those polymers of the monomers mentioned herein. The best results have been obtained using a finely divided silica with a particle size of between 0.1 and 100 microns.

The radiopaque material must be inert and non-toxic. Desirably it does not interfere with the shelf-life or polymerization of the product and must not adversely influence the properties of either the paste or the polymerized product.

There can be incorporated in the monomer prior to polymerization various medicaments, e.g., in an amount of 0.1 or less to 10% of the monomer, e.g., HEMA. The medicine will then be available for continual and gradual release through the hydrophilic polymer, in a manner similar to Shepherd U.S. Pat. No. 3,618,213, example 20a. Medicines which can be employed include, for example: Novocaine (procaine hydrochloride), Benzocaine (ethyl aminobenzoate), ascorbic acid, butacaine sulfate, dibucaine hydrochloride, riboflavin, thiamine, nicotinic acid, Vitamin $D_2$, Vitamin E, Vitamin K, Bacitracin, hexachlorophene, lincomycin hydrochloride, sulfadiazine, procaine penicillin, aureomycin, streptomycin, terramycin, chloramphenicol, penicillin, neomycin sulfate, succinoyl-sulfathiazole, cetyl pyridinium chloride, trimethyl benzyl ammonium chloride, triethyl dodecyl ammonium bromide, sulfathiazole, sulfanilamide, phenobarbital, pentabarbital sodium, butabarbital, diethyl stilbesterol, progesterone, testosterone, Nilevar, amobarbital, secobarbital sodium, sodium phenobarbital, pentaerythritol tetranitrate, nitroglycerine, amphetamine sulfate, d-amphetamine sulfate, griseofulvin, ketaphenylbutazone, tetracycline, nicotinic acid hydrazide, p-amino salicylic acid, aspirin and xylocaine.

A typical example of the hydrophilic system is the root canal filling material based on the use of hydroxyethyl methacrylate with a red-ox initiating system. It consists of two components, A and B, which are packaged separately. As shown in Table 1, the monomer, cross-linking agent, ethyleneglycol dimethacrylate, inhibitor, 2,2'-methylene-bis-4-methyl-6-t-butyl phenol (Plastanox P2246), and reducing agent or catalyst, N,N-dihydroxyethyl-p-toluidine (accelerator A), are included in component A. The initiator, dibenzoyl peroxide, and suitable solvent, glycerol diacetate (diacetin), are included in compoment B. Both components also contain barium sulfate and finely divided silica (Cab-O-Sil).

The monomer is separated from the initiator to insure satisfactory shelf stability before mixing. The amine catalyst is used for polymerization at body temperature (37°C.). Glycerol diacetate is used both as a vehicle for component B and to control the volume expansion of the resulting implant. Barium sulfate is used to impart radiopaqueness. Finely divided silica is used as a thickening agent to prevent settling of suspended barium sulfate and to provide the required rheological properties. Bismuth subcarbonate is twice as effective as barium sulfate as a radiopaque material at the same weight level.

TABLE 1

| Component A | Weight Percent |
| --- | --- |
| Hydroxyethyl Methacrylate | 60.98 |
| Ethyleneglycol Dimethacrylate | 0.30 |
| N,N'-Dihydroxyethyl-p-toluidine (accelerator A) | 0.62 |
| 2,2'-Methylene-bis-4-methyl-6-t-butyl phenol (Plastanox P2246) | 0.10 |
| Barium Sulfate | 35.00 |
| Finely divided Silica (Cab-O-Sil) | 3.00 |
| Component B | Weight Percent |
| Glycerol Diacetate | 61.10 |
| Dibenzoyl Peroxide | 1.90 |
| Barium Sulfate | 35.00 |
| Finely divided Silica (Cab-o-Sil) | 2.00 |

The root canal filling material set forth in Table 1 is prepared as follows: Medical grade hydroxyethyl methacrylate is first adjusted, for production purposes, to contain 0.30 weight percent of ethyleneglycol dimethacrylate. Except for the silica, all the ingredients in both components are blended for ten minutes in a homogenizer at full speed. Finely divided silica is then added to each blended component and mixed well. Both components are packaged in polyethylene tubes, heat sealed and stored when not in use under refrigeration at 5°C.

The rate of polymerization depends on the ratio of components used. By adjusting the volumes of A and B, any desirable working period for the mixture can be attained. A practical mixture containing 0.7 ml of A and 0.3 ml of B has a working time of about ten minutes. This amount of material is convenient to measure, mix and deliver. As a single root canal filling requires about 0.1 ml of the mixture, this amount is sufficient for several teeth. The ten minutes working time is more than sufficient for a dentist to accomplish the necessary operations. Once mixed, the system is thixotropic and can be picked up and injected by a syringe. After the delivery, it polymerizes in about fifteen minutes and can then be treated as a normal root canal filler.

When the barium sulfate in Table 1 is replaced by bismuth subcarbonate a considerable improvement in radiopaque properties was noted.

Typical suitable weight ratios of Component A to Component B are 9:1, 8:2, 7:3 and 6:4.

The range of materials can vary widely as set forth below. The percents are all by weight.

| Component A | Range | Preferred Range |
| --- | --- | --- |
| HEMA | 25–99.95% | 40–80% |
| Diester | 0.05–5.0 | 0.1–1 |
| Accelerator | 0–1.5 | 0.1–1.5 |
| Barium Sulfate (or other radiopaque material) | 0–75 | 10–60 |
| Finely Divided Silica (or equiv.) | 0–10 | 1–10 |
| Drug | 0–10 | 0.1–10 (if employed) |
| Component B | | |
| Diacetin (or other diluent) | 25–94% | 50–94 |
| Benzoyl Peroxide (or equiv.) | 0.5–2.5 | 0.5–2.5 |
| Finely Divided Silica (or equiv.) | 0–10 | 1–10 |
| Barium Sulfate (or equivalent) | 0–75 | 10–60 |

The invention will be understood best in connection with the following examples. Unless otherwise indicated, all parts and percentages are by weight.

EXAMPLE 1

There were dissolved in 61 parts of hydroxyethyl methacrylate 0.3 part of ethyleneglycol dimethacrylate, 0.6 part of N,N-dihydroxyethyl-p-toluidine (cocatalyst), 0.1 part of 2,2'-methylene bis-4-methyl-6-t-butyl-phenol (polymerization inhibitor). Thirty-five parts of finely powdered barium sulfate were intimately mixed into the solution and finally, 3 parts of finely divided silica filler were admixed. The resulting white, highly thixotropic paste was labeled Component A.

1.9 parts of dibenzoyl peroxide (polymerization initiator) were dissolved in 61.1 parts of glycerol diacetate. Thirty-five parts of barium sulfate and 2 parts of finely divided silica were intimately mixed into the solution. The resulting white, highly thixotropic paste was labeled Component B.

To prepare the root canal filling material, 7 parts of Component A and 3 parts of Component B were mixed together. Polymerization started after 10 minutes with a full cure being attained after 15 minutes.

Similar results are obtained by replacing the barium sulfate in both components A and B by the same weight of bismuth subcarbonate to give a product with improved radiopaque properties.

EXAMPLE 2

Thirty-five parts of finely powdered barium sulfate were thoroughly mixed with 62 parts of 2-hydroxyethyl methacrylate, containing 0.3 part of ethylene glycol dimethacrylate and 0.5 part of N,N-dihydroxyethyl-p-toluidine. Into the slurry 3 parts of the finely divided silica filler were mixed. The resulting white highly thixotropic paste was labeled Component A. Into 93.5 parts of glycerol diacetate 5 parts of finely divided silica and 1.5 parts of dibenzoyl peroxide were admixed. This highly thixotropic paste was labeled Component B.

To prepare the root canal filling material 8 parts of Component A were mixed with 2 parts of Component B. Polymerization started between 3 to 5 minutes after mixing and was completed after 5 to 8 minutes.

EXAMPLE 3

Components A and B were prepared as in Example 2 except that the solvent of Component B was glycerol.

EXAMPLE 4

Thirty parts of finely powdered barium sulfate were thoroughly mixed with 65 parts of a monomeric mixture consisting of 89.9 parts of 2-hydroxyethyl methacrylate, 10 parts of methyl methacrylate and 0.1 part of diethyleneglycol dimethacrylate. Into the resulting slurry 0.3 part of N,N-dihydroxyethyl-p-toluidine and 4.7 parts of finely divided silica were admixed, forming Component A.

Component B was prepared in the same manner as in Example 2 from the same materials.

To prepare the root canal filling material, 9 parts of Component A and 1 part of Component B were mixed. This material started polymerization in 6 to 9 minutes and completely set after 10 to 12 minutes.

EXAMPLE 5

Component A was prepared as in Example 4, only the monomers used consisted of 79.5 parts of 2-hydroxyethyl methacrylate, 20 parts of butyl acrylate and 0.5 part of ethyleneglycol dimethacrylate. Component B was the same as in Example 4.

EXAMPLE 6

Component A was prepared as in Example 4, only the monomers used consisted of 98 parts of 2-hydroxyethyl methacrylate, 1.5 parts of 2-sulfoethyl methacrylate and 0.5 part of ethyleneglycol dimethacrylate. Component B was the same as in Example 4.

EXAMPLE 7

Components A and B were prepared as in Example 4, only the solvent of Component B was propylene glycol.

EXAMPLE 8

Component A was prepared as in Example 4, only the monomers used consisted of 95 parts of 2-hydroxyethyl methacrylate, 4.5 parts of N-vinyl pyrrolidone and 0.5 part of ethylene glycol dimethacrylate. Component B was the same as in Example 4.

EXAMPLE 9

Forty parts of finely powdered barium sulfate were thoroughly mixed with 60 parts of a mixture. This mixture contained 10 parts of finely ground (mesh 325) non-crosslinked poly(hydroxyethyl methacrylate), 0.4 part of ethyleneglycol dimethacrylate and 1.0 part of N,N-dimethyl-p-toluidine, and 48.6 parts of hydroxyethyl methacrylate. The resulting white paste was labeled Component A.

There were admixed in 88.5 parts of hydroxyethyl methacrylate 1.5 parts of benzoyl peroxide as a peroxydic initiator and 10 parts of highly crosslinked poly(hydroxyethyl methacrylate) (particle size 1-10 microns). This paste was labeled Component B.

When 8 parts of Component A were mixed with 2 parts of Component B, polymerization started between 7 and 9 minutes and the material fully cured at body temperature in 15 minutes.

EXAMPLE 10

The procedure of Example 1 was repeated but there was added 0.2 part of benzocaine in Component A.

Vital and non-vital inciser teeth of 12 adult monkeys were endodontically prepared and filled via intracanal injection. The formulations employed were as follows:

| Experiment 1 | | |
|---|---|---|
| Component A | | Component B |
| HEMA (hydroxyethyl methacrylate) | 65.48% | Diacetin 93.57 |
| EGDM (ethylene glycol dimethacrylate) | 0.20 | Benzoyl peroxide 1.43 |
| Accelerator A | 0.32 | Cab-O-Sil 5.00 |
| $BaSO_4$ | 30.00 | |
| Cab-O-Sil | 4.00 | |

Six teeth were treated with the mixture of Components A and B using a total of 0.8 ml of Component A and 0.2 ml of Component B.

| Experiment 2 | | |
|---|---|---|
| Component A | | Component B |
| HEMA | 61.50% | Diacetin 93.50 |
| EGDM | 0.20 | Benzoyl peroxide 1.50 |
| Accelerator | 0.32 | Cab-O-Sil 5.00 |
| $BaSO_4$ | 35.00 | |
| Cab-O-Sil | 3.00 | |

Components A and B were mixed in the amounts of 0.8 ml of Component A and 0.2 ml of Component B.

| Experiment 3 | | |
|---|---|---|
| Component A | | Component B |
| HEMA | 53.00% | Same as in Experiment 1 |
| EGDM | 0.15 | |
| Accelerator A | 0.32 | |
| $BaSO_4$ | 45.00 | |
| Cab-O-Sil | 1.50 | |

Components A and B were mixed in the amounts of 0.8 ml of Component A and 0.2 ml of Component B.

A total of 6 teeth were injected with the formulation prepared in Experiments 2 and 3. Some of the teeth were filled with the mixture of Experiment 2 and the others with the mixture of Experiment 3.

| Experiment 4 | |
|---|---|
| Component A | Component B |
| Same as in Experiment 1 | Same as in Experiment 2 |

Components A and B were mixed in the amounts of 0.8 ml of Component A and 0.2 ml of Component B.

A total of 8 teeth were treated with the mixture thus prepared.

| Experiment 5 | | |
|---|---|---|
| Component A | | Component B |
| HEMA | 66.28% | Diacetin 93.3% |
| Accelerator A | 0.65 | Benzoyl peroxide 1.7 |
| Plastanox P2246 | 0.07 | Cab-O-Sil 5.0 |
| $BaSO_4$ | 30.00 | |
| Cab-O-Sil | 3.00 | |

Components A and B were mixed in the amounts of 0.8 ml of Component A and 0.2 ml of Component B.

A total of 8 teeth were treated with the mixture thus prepared.

| Experiment 6 | | |
|---|---|---|
| Component A | | Component B |
| HEMA | 61.00% | Diacetin 61.55% |
| EGDM | 0.30 | $BaSO_4$ 35.00 |
| Accelerator A | 0.61 | Benzoyl peroxide 0.95 |
| Plastanox P2246 | 0.06 | Cab-O-Sil 2.50 |
| $BaSO_4$ | 35.00 | |
| Cab-O-Sil | 3.00 | |

Components A and B were mixed in the amounts of 0.7 ml of Component A and 0.3 ml of Component B.

A total of 8 teeth were treated with the mixture thus prepared.

What is claimed is:

1. A process comprising filling a root canal with a fluid hydrophilic polymerizable material consisting essentially of a member of the group consisting of hydroxy lower alkyl acrylates and methacrylates, hydroxy lower alkyl lower alkoxy acrylates and methacrylates, hydroxy lower alkyl poly(lower alkoxy) acrylates and methacrylates, methacrylamide, acrylamide, N-lower alkyl acrylamides and N-lower alkyl methacrylamides and vinyl pyrrolidone, up to 25% of an alkyl acrylate or methacrylate and 0.05 to 5.0% of a polyethylenically unsaturated monomer as a cross-linking agent.

2. A process according to claim 1 wherein the polymer composition formed in the root canal is swellable with hydration to between 5 and 25 volume percent.

3. A process according to claim 1 wherein the polymerizable material is injected as a flowable paste into the root canal.

4. A process according to claim 1 wherein the hydrophilic polymerizable material comprises hydroxyethyl acrylate, hydroxyethyl methacrylate, hydroxypropyl acrylate or hydroxypropyl methacrylate.

5. A process according to claim 4 wherein there is present a polyethylenically unsaturated monomer in an amount of 0.05 to 2% as a cross-linking agent.

6. A process according to claim 5 wherein a medicament is included in the composition.

7. A process according to claim 5 wherein a thixotropic filler is included in the composition.

8. A process according to claim 7 wherein a radiopaque material is included in the composition.

9. A process according to claim 5 wherein the polymerizable material comprises hydroxyethyl methacrylate.

10. A process according to claim 9 wherein 0.05–2% of ethylene glycol dimethacrylate is employed as a cross-linking agent.

11. A process according to claim 1 wherein a radiopaque material is included in the composition.

12. A process according to claim 11 wherein the radiopaque material is barium sulfate.

13. A process according to claim 11 wherein the polymerizable materials consist essentially of hydroxyethyl acrylate, hydroxyethyl methacrylate, hydroxypropyl acrylate or hydroxypropyl methacrylate.

14. A process according to claim 13 wherein there is present a polyethylenically unsaturated monomer in an amount of 0.05 to 2% as a cross-linking agent.

15. A root canal of a tooth filled with a water insoluble hydrophilic polymer consisting essentially of a polymer of a member of the group consisting of hydroxy lower alkyl acrylates and methacrylates, hydroxy lower alkyl lower alkoxy acrylates and methacrylates, hydroxy lower alkyl poly(lower alkoxy) acrylates and methacrylates, methacrylamide, acrylamide, N-lower alkyl acrylamides and N-lower alkyl methacrylamides and vinyl pyrrolidone, up to 25% of an alkyl acrylate or methacrylate and 0.05 to 5.0% of a polyethylenically unsaturated monomer as a cross-linking agents.

16. A filled root canal according to claim 15 wherein the polymer is a polymer of a hydroxy lower alkyl acrylate or methacrylate.

17. A filled root canal according to claim 16 wherein the polymer is a polymer of hydroxyethyl methacrylate.

18. A filled root canal according to claim 16 wherein the polymer is a cross-linked water swellable polymer.

19. A filled root canal according to claim 16 wherein the polymer is swellable in the presence of moisture to the extent that the root canal cavity is permanently sealed.

20. A filled root canal according to claim 16 wherein the filling includes a radiopaque material.

21. A filled root canal according to claim 20 wherein the filling includes silica.

22. A filled root canal according to claim 20 wherein the radiopaque material is barium sulfate.

23. A filled root canal according to claim 15, wherein the filling includes a radiopaque material.

24. A filled root canal according to claim 23 wherein the polymer consists essentially of a polymer of hydroxyethyl acrylate, hydroxyethyl methacrylate, hydroxypropyl acrylate or hydroxypropyl methacrylate.

25. A process according to claim 24, wherein there is present a polyethylenically unsaturated monomer in an amount of 0.05 to 2% as a cross-linking agent.

26. A composition comprising hydroxy lower alkyl acrylate or methacrylate and bismuth subcarbonate in an amount sufficient to act as a radiopaque material upon polymerization of the acrylate or methacrylate.

27. A composition according to claim 26 in the form of a paste.

* * * * *

UNITED STATES PATENT OFFICE
CERTIFICATE OF CORRECTION

Patent No. 3,925,895            Dated December 16, 1975

Inventor(s) Karel Kliment and Robert S. Tu

It is certified that error appears in the above-identified patent and that said Letters Patent are hereby corrected as shown below:

Insert Item [30] as follows:

--[30]    Foreign Application Priority Data

July 6, 1972   Great Britain . . . 31657/72--

Signed and Sealed this ninth Day of March 1976

[SEAL]

Attest:

RUTH C. MASON
Attesting Officer

C. MARSHALL DANN
Commissioner of Patents and Trademarks